July 28, 1959     O. VON ZELEWSKY     2,896,490

HYDRAULIC COPYING ATTACHMENT ON LATHES

Filed Sept. 8, 1953     5 Sheets-Sheet 1

INVENTOR:
Ottomar von Zelewsky
BY
Richards & Geier
ATTORNEYS

July 28, 1959  O. VON ZELEWSKY  2,896,490
HYDRAULIC COPYING ATTACHMENT ON LATHES
Filed Sept. 8, 1953  5 Sheets-Sheet 2

INVENTOR.
Ottomar Von Zelewsky
BY
Richards & Geier
ATTORNEYS

July 28, 1959     O. VON ZELEWSKY     2,896,490
HYDRAULIC COPYING ATTACHMENT ON LATHES
Filed Sept. 8, 1953     5 Sheets-Sheet 4

INVENTOR.
Ottomar Von Zelewsky
BY
Richards Geier
ATTORNEYS

July 28, 1959   O. VON ZELEWSKY   2,896,490
HYDRAULIC COPYING ATTACHMENT ON LATHES
Filed Sept. 8, 1953   5 Sheets-Sheet 5

INVENTOR.
Ottomar Von Zelewsky
BY
Richards & Geier
ATTORNEYS

United States Patent Office 2,896,490
Patented July 28, 1959

2,896,490

HYDRAULIC COPYING ATTACHMENT ON LATHES

Ottomar Von Zelewsky, Neuhausen am Rheinfall, Switzerland, assignor to Georg Fischer Aktiengesellschaft, Schaffhausen, Switzerland, a Swiss company Application September 8, 1953, Serial No. 379,049

Claims priority, application Switzerland September 13, 1952

6 Claims. (Cl. 82—14)

The present invention relates to a control device for a copying lathe having a hydraulic copying attachment for controlling a plurality of successive cutting operations. It is known in connection with an automatic purely mechanically controlled lathe to control a plurality of successive cutting operations by cams which are screwed on a cylindrical control drum, that is to say, to initiate the sequence of intended cutting operations one after the other, to complete such operations and to return the tool slide to the original position again. The present invention constitutes a solution which hydraulically controls a sequence of several operations and at the same time makes use of a hydraulic copying attachment.

The control device according to the present invention differs from known constructions by the fact that a cylindrical control drum has cams arranged thereon in radial planes in such manner that the cams by means of control valves hydraulically control the switching in the feed gearing, the feeding movements of the copying slide and the shifting movements between the control valves and the control drum axially of the latter.

One constructional example of the subject of the invention is shown in the drawings, wherein.

Figure 1:
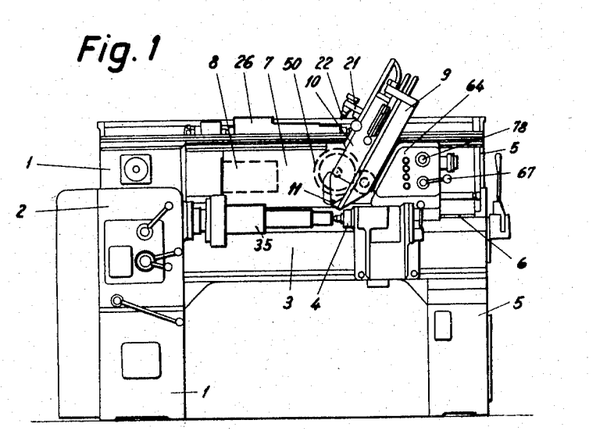
Fig. 1 is a front elevation of a copying lathe.
Figure 2:
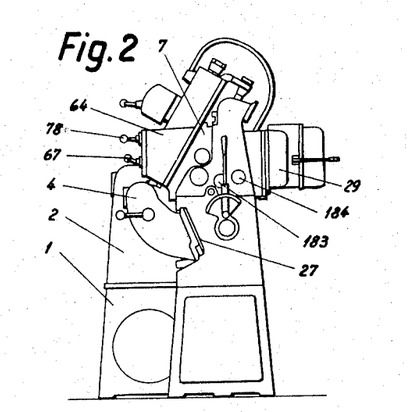
Fig. 2 is a side elevation of the copying lathe according to Figure 1.

In Figures 1 and 2, a copying lathe is shown diagrammatically with a stand 1, a head stock 2, a lathe bed 3 connected to the latter at one end, a tail stock 4 being displaced parallel to the axis of rotation on a slide track 27 on the bed 3 and being adapted to be secured by means (not shown). The lathe bed 3, supported at the other end by a stand 5, is also provided on top with slide tracks 6 on which a carriage 7 with a feeding gear box 8 built therein is arranged to be displaceable parallel to the axis of rotation.

Figures 4, 5, 9, 10, 14:
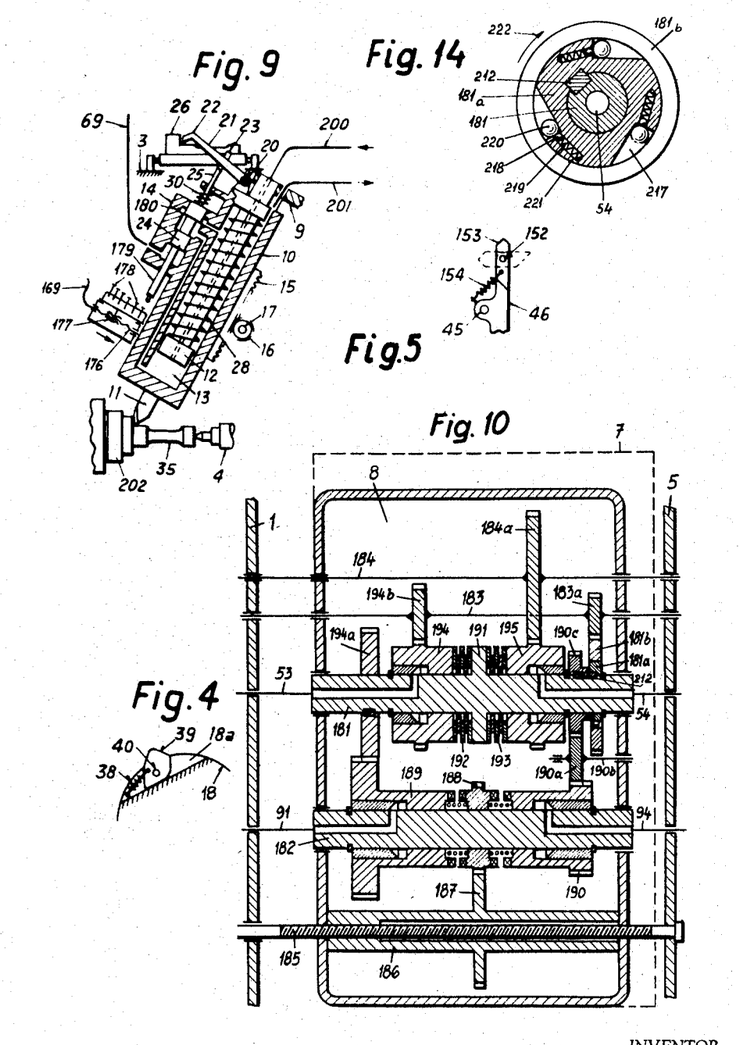
Fig. 4 shows details of a trip cam as a section on the line A—A of Figure 3.
Fig. 5 shows details of a latch lever.
Fig. 9 is a diagram showing the hydraulic copying control means.
Fig. 10 is a diagram showing the feeding gear box.
Fig. 14 is a section through the free wheel drive shown in Figure 10.

Figure 10 of the drawings shows the detail of the feeding gear box 8 contained in the main carriage 7 indicated by broken lines. Held axially in the machine stands 1 and 5 are a feed shaft 183 and a high-speed shaft 184. The drive for these two shafts 183 and 184 is effected from the head stock 2 by means which are not shown. These two shafts 183 and 184 are continuously revolving when the head stock motor (not shown) is switched on. A feed spindle 185 is also held axially and secured against turning in the stands 1 and 5. Mounted on the latter is a nut 186 with a toothed rim 187 which is constantly in mesh with a toothed wheel 188 keyed to a gear shaft 182, the wheel 188 also having lateral coupling teeth thereon. The gear shaft 182 and another gear shaft 181 are mounted so as to be rotatable but not movable axially, in the feeding gear box 8 in the carriage 7.

Displaceable axially on the gear shaft 182 are two toothed slide wheels 189 and 190 also having coupling teeth which can be brought into mesh with the lateral coupling teeth of the toothed wheel 188. The slide wheel 189 continuously meshes with a toothed wheel 194a keyed to the gear shaft 181. The slide wheel 190 continuously meshes with a gear wheel 190a on a shaft 190b, which meshes with a toothed wheel 190c keyed to the gear shaft 181. Mounted on the gear shaft 181, which has a collar 191, are two plate clutches 192 and 193. An axially displaceable toothed wheel 195 is constantly driven by the high speed shaft 184 by means of a toothed wheel 184a. Another axially displaceable toothed wheel 194 is driven by the feed shaft 183 and a toothed wheel 194b. The gear shaft 181 is driven by the feed shaft 183 and a toothed wheel 183a, the latter being continuously in mesh with a loose gear wheel 181b of an over-drive clutch, shown in greater detail in Figure 14 and having a hub 181a which is keyed to the gear shaft 181 by means of a key 212. In the hub 181a three grooves 217 with bores 221 are provided and in each of the latter a compression spring 219 and a ball 218 are inserted. In each of the grooves 217 a coupling ball 220 is freely moveable and the compression springs 219 tend to press the balls against the bore of the surrounding wheel 181b, whereby a coupling action takes place between the hub 181a and the bore of the wheel 181b, if and when the latter revolves in the direction of the arrow 222. If the hub, however, rotates faster than the wheel 181b in the direction of arrow 222, the coupling balls 220 are slightly pressed against the balls 218 and the springs 219, so that there is no coupling action between the members 181a and 181b.

A pipe line 53 is connected to the left hand end of the gear shaft 181 (looking in the direction of Fig. 10), and, by applying pressure to the pipe line 53, the wheel 194 is pressed towards the plate clutch 192 and the collar 191; thus the gear shaft 181 and the wheel 194 are coupled together and the feed shaft 183 drives the toothed wheel 189 by means of the wheels 194b and 194, the clutch 192, the collar 191, the shaft 181, and the wheel 194a. In a similar manner the high speed shaft 184 may be coupled with toothed wheel 190 by the wheels 184a and 195, the clutch 193, the collar 191, the shaft 181, and the wheels 190c and 190a, when pressure is applied to a pipe line 54. By applying pressure to either of the pipe lines 53 or 54 no feed motion of the main carriage 7 occurs, such motion being initiated by applying pressure to either of pipe lines 91 or 94, as hereinafter described.

The pipe line 91 is connected to the left hand end of the gear shaft 182 and when pressure is applied to the pipe line 91 the slide wheel 189 is shifted to the right and its lateral coupling teeth mesh with the lateral coupling teeth of the wheel 188. In this way the rotational motion of the wheel 189 is transmitted to the nut 186. The rotational motion of the wheel 190 is transmitted to the nut 186 in an identical way when pressure is applied to the pipe line 94.

In order to obtain normal feed motion forward of the main carriage 7 pressure is applied to the pipe lines 53 and 91, as described hereinafter. Now the rotational motion of the feed shaft 183 is transmitted to the nut 186 through the members 183—194b—194—192—191a—189—187 to the member 186. During this movement the overdrive clutch 181a allows the wheel 181b to rotate freely.

If normal feed motion in rearwards direction is desired, pressure is applied to the pipe lines 53 and 94. The rotation of feed shaft 183 is transmitted to the nut 186 through the members 183—194b—194—192—191—181—190c—190a—190—182—188—187 to 186. During this feed movement the member 181a can revolve freely in member 181b.

Half speed motion in forward direction is obtained when the pipe lines 53, 54 and 94 are without any pressure and when pressure is applied to pipe line 91 only. In this case the rotation of feed shaft 183 is transmitted to the nut 186 through the members 183—183a—181b—181a—212—181—194a—189—182—188—187 to 186.

Half speed motion in rearward direction is obtained when the pipe lines 53, 54 and 91 are pressureless and when pressure is applied to pipe line 94 only. The rotation of feed shaft 183 is transmitted to nut 186 through the members 183—183a—181b—181a—212—181—190c—190a—190—182—188—187 to 186.

High speed motion in forward direction is obtained when pressure is applied to pipe lines 54 and 91. The rotational motion of high speed shaft 184 is transmitted to the nut 186 through the members 184—184a—195—193—191—181—194a—189—182$_4$—188—187 to 186.

High speed motion in rearward direction is obtained when pressure is applied to the pipe lines 54 and 94. The rotational motion of high speed shaft 184 is transmitted to nut 186 through the members 184—184a—195—193—191—212—190c—190a—190—182—188 — 187 to 186.

The carriage 7 has mounted thereon a copying slide guideway 9 and it also has (not shown), displaceably arranged thereon a copying or tool slide 10 with a turning tool 11. As will be seen from Figure 9, the working piston 12, which is connected with the copying slide guideway 9, slides in the bore 13 of the copying slide 10 with the control housing 14, a compression spring 28 urging the copying slide 10 into its topmost position in which the piston 12 is at the bottom end of the bore 13. The piston 12 and the bore 13 constitute second hydraulic means for moving the copying slide 10. Arranged on the copying slide 10 is a rack 15 which is engaged by a pinion 16 mounted in the copying slide guide 9, said pinion being carried by an adjusting shaft 17 with cam discs 18 and 19. As shown in Figure 4, the latter each have arranged in a recess 18a and 19a, respectively a cam 39 and 37, respectively, which is adapted to rock about a shaft 40. The cam 39 or 37 is held in the position shown in Figure 4 by a tension spring 38. Arranged on the copying slide 10 is a feeler lever 21 which is adapted to rock about a shaft 20 and the feeler 22 of which, during the copying of a workpiece 35, can be guided along a copying template 26 which is arranged to be longitudinally adjustable on the lathe bed 3. A pattern could also be employed instead of the copying template 26. Provided in the rod 25 of the control slide valve 24 is a slot 23, through which the feeler lever 21 is guided. When adjusting the feeler lever 21, the control slide valve 24 must positively follow the movements of the feeler lever 21. A compression spring 30 urges the control slide valve 24 in a downward direction (Figure 9), the control slot 180 thereby being closed.

A pipe line 69 leads into a space below the control slide valve 24. When (as hereinafter described) pressure is applied to the pipe line 69, the control slide valve 24 is urged in an upward direction (Figure 9) against the action of the spring 30. By this movement the control slot 180 is opened, and the pressure medium entering a pipe line 200 escapes through the bore 13 and the slot 180 into a pipe line 201 whereby the tool slide 10, under the action of the spring 28, is retracted from the workpiece 35. When the pressure in the pipe line 69 is released, the spring 50 lowers the control slide valve 24, as described above.

Figure 3:
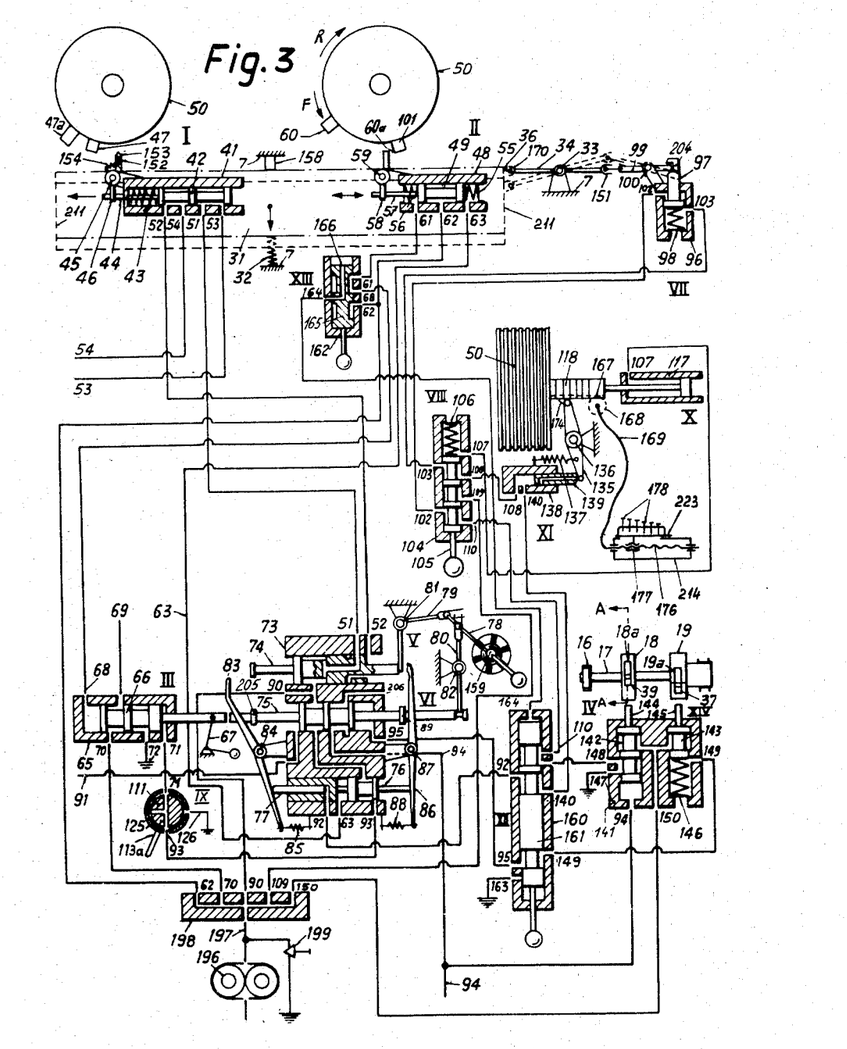
Figure 3 is a diagram of the hydraulic control.

Arranged in the carriage 7 are the control elements which are indicated in the diagram of Figure 3 by the Roman numerals I to XIV and which are more fully described hereinafter.

Figure 6:
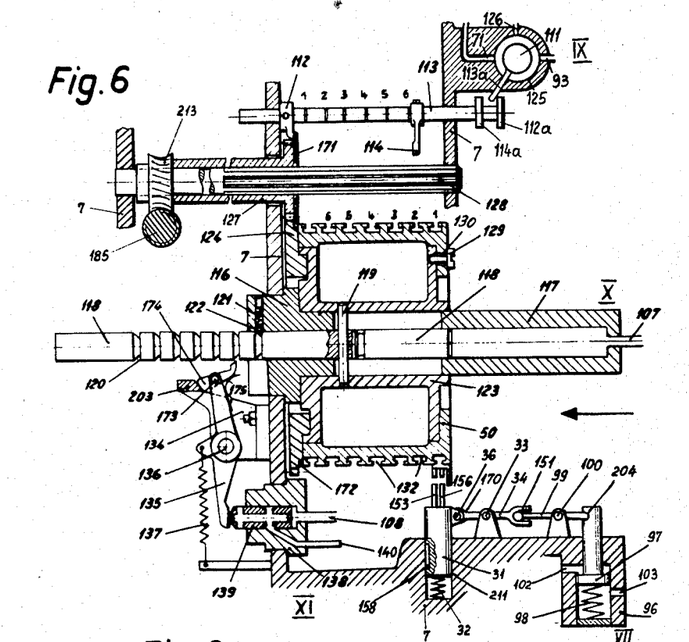
Fig. 6 is a longitudinal section through the control drum.

Arranged to be vertically displaceable in a switch box 29 at the rear of the carriage 7 (see Figure 2) on guide tracks 211 (Fig. 6) is a valve slide 31 which is shown diagrammatically in Figures 3 and 6 and which carries the control elements I and II, a spring 32 supported in the carriage 7 displacing the valve slide 31 into the topmost position shown in Figs. 3 and 6. This position is determined by a stop 158. A lever 34, which is adapted to pivot about a shaft 33, engages at one end with the fork 170 in a driver member 36 on the valve slide 31, while the other end thereof has a fork 151 which is engaged by one of the arms of the lever 99.

*Control element I.*—Arranged for longitudinal displacement in a housing 41 on the valve slide 31 is a slide valve 42 with a control rod 44, the slide valve 42 being held in the position shown in Figure 3 by a spring 43. As shown in Figure 5, one arm of a lever 46 which is pivotal about a shaft 45 and which is pivotally connected to the control rod 44 has mounted thereon a latch or pawl 153 which is adapted to rock about a pin 152 and which is held by a spring 154 in the position shown in Figure 3. The pawl 153 may be actuated by cams 47 and 47a arranged on a control drum 50. Figure 5 shows in broken lines the position of the pawl 153 in the unlatched position. Pipe lines 51, 52, 53 and 54 are connected to the control housing 41. By operating the control element I by means of the cams 47 and 47a on the control drum 50, it is possible to control the feeding movement of the carriage 7. The position of the slide valve 42 as shown in Figure 5 controls the feeding box 8 in such manner that normal feed motion of the carriage 7 is obtained when the plate clutch 192 is engaged. During the normal feed motion the pipe line 91 is under pressure and the wheels 189 and 188 are engaged. If the slide valve 42 is shifted somewhat to the left, which is the case when the cam 47 engages the pawl 153, the pipe lines 53, 54 are without pressure and half speed motion of the carriage 7 is obtained from the shaft 183 by means of the over-drive-clutch by means of the wheels 183a, 181b, 181a, the shaft 181, the wheels 194a, 189, the shaft 182, the wheel 188, and the rim 187, to the nut 186.

By moving the slide valve 42 fully to the left, which is the case when the cam 47a engages the pawl 153, the pipe line 54 receives pressure from the pipe line 51 and the plate clutch 193 is engaged, whereupon the high-speed motion of the carriage 7 is obtained by means of the members 184, 184a and 195, 193, 191, 181, 190c, 190a and 190. In order to obtain high speed motion, pressure has been applied to the pipe line 94 and the pipe line has been connected with the sump, as hereinafter described. Thus the wheels 189 and 188 are disengaged and the wheels 190 and 188 engaged. By turning the control drum 50 in a counter-clockwise direction, the lever 46 is rocked by the cams 47, 47a; when the drum rotates in the opposite direction, the cams 47, 47a slip over the pawl 153, so that the lever 46 is not moved. The rotational motions of the control drum 50 are proportional to the longitudinal movements of the main carriage. If the latter moves from left to right, for instance, the control drum 50 revolves clockwise, and vice versa.

*Control element II.*—A slide valve 49 with a control rod 57 is arranged for longitudinal displacement in a housing 48 on the valve slide 31, said slide valve being held by the two compression springs 55 and 56 in the middle position shown in Figure 3. A lever 58, which is pivotal about a shaft 59 is pivotally connected to the control rod 57, as shown in Figure 3. The lever 58 can be actuated by cams 60 and 60a arranged on the control drum 50, the feed travel being switched off when the slide valve 49 is shifted to the left, whereas the high speed travel in rearward direction is switched off upon displacement of the slide valve 49 to the right.

When the valve 49 is shifted to the left, pressure medium from a pipe line 62 enters a pipe line 61 and flows, through control element XIII, into a pipe line 68. A slide valve 66, in control element III, is forced to the right by the pressure medium flowing in the pipe line 68. Pressure medium from the pipe line 70 can flow into the pipe line 69 leading to the copying slide 10, in which the control slide valve 24 is raised against the action of spring 30, and opens control slot 180. Pressure medium from pipe line 200 passes through the bore 13 and control slot 180 back into outlet pipe line 201, and the copying slide 10 together with the copying tool 11 is withdrawn from the workpiece 35 by the action of spring 28. Due to the upward movement of the tool slide 10, the shaft 17 revolves and with it the cam disc 19 in control element IV, as described hereinafter. A slide valve 142 is pressed downwards and pressure medium from a pipe line 150 enters a pipe line 148, and passes through a pipe line 110 to a pipe line 102, where it presses down a slide valve 97, then flows through pipe lines 103, 108, 140 and 92, pushes a valve piston 77 to the left and rocks a two-armed lever 83 in a clockwise direction. By this rocking movement the slide valves 74 and 75 are pushed to the right into positions which are not shown in the drawings. Pressure medium from the pipe line 90 enters the pipe line 51 and, through the control element I, enters the pipe line 54. At the same time, pressure medium from the pipe line 90 in the control element VI enters the pipe line 94, whereby the high speed return motion is initiated. The high speed return motion of the carriage 7 is switched off upon displacement of the slide valve 49 towards the right from the middle position illustrated, since pressure medium from the pipe line 62 enters a pipe line 63 and pushes a control slide valve 76 to the right, whereby a lever 86 is rocked to its vertical position shown in Figure 3. Another control slide valve 75 is pushed to the left without influencing the valve 66 of the control element III. Also a valve 74 is pushed into the position shown in Figure 3, whereby the pipe line 94 in control element VI is connected to exhaust 206, thus interrupting the high speed return motion of the main carriage 7. The pipe lines 61, 62 and 63 are connected to the control housing 48 and the pawl 156 operates in a manner similar to that described with reference to control element I.

*Control element III.*—A slide valve 66 is arranged to be axially displaceable by an adjusting lever 67 in a valve housing 65 arranged in the feed control housing 64 (Figure 1) of the carriage 7. Connected to the valve housing 65 are pipe lines 68, 69, 70, 71 and 72. The feed movement of the copying slide 10 may be controlled, through the control element III either manually by means of the adjusting lever 67 or by means of the control element VI or VIII, as hereinafter described.

*Control elements IV and XIV.*—Arranged for longitudinal displacement in a housing 141 are two slide valves 142 and 143. Extending from the slide valve 142 towards the cam 39 (Figure 4) is a rod 144; the slide valve 142 can be forced downwardly by the cam 39 from the position shown in Figure 3. The slide valve 143 with the rod 145 is urged by a spring 146 into the position shown in Figure 3. It can be forced downwardly by the cam 37 against the action of the spring 146. Connected to the housing 141 are the pipe lines 94, 147, 148, 149, 150. By means of the control element IV, the high-speed return movement of the carriage 7 is controlled in dependence upon the position of the copying slide 10 with respect to the workpiece 35. The feeding movement of the carriage 7 is controlled by the control element XIV, also in dependence upon the position of the copying slide 10 in relation to the workpiece 35.

*Control elements V and VI.*—These control elements constitute the first hydraulic means which comprise control slide valves 74, 75, 76 and a piston 77 are arranged for axial displacement in a valve block 73 in the feed control housing 64. A feed control lever 78 which is shown diagrammatically in Figure 3 and which is mounted in the housing 64 to rock about a spherical pivot 159, renders it possible for the various movements of the carriage as hereinafter described, such as normal feed forwards and rearwards, half speed forwards and rearwards and high speed forwards and rearwards, to be set in known manner (which is not described in detail) by means of forked levers 79 and 80 which are mounted at the points 81 and 82, respectively. The feed control lever 78 has two ball-shaped sections which slide in the forked ends of the levers 79 and 80. In changing the position of the lever 78 both or only one of the levers 79 and 80 are rocked about the points 81 and 81, respectively, and thus influence the positions of the slide valves 74 and 75 to obtain the desired movements of the main carriage 7.

In known manner, common to slide wheel gears (not shown in the drawing) the levers 79 and 80 are mechanically coupled with the slide gear wheels 194, 195, 189 and 190 to allow, by axial displacement of the latter, the manual setting of the desired speed by means of lever 78. Therefore, when in an automatic cycle the position of the forked levers 79 and 80, and thus of the coupling conditions of the slide wheels in the gear box 8 is changed hydraulically by means of the pistons 74 and 75, the lever 76 automatically moves into the position given by the desired speed.

At one end of the valve block 73, there is also arranged a two-armed lever 83 for pivotal movement about a shaft 84, the said lever being rocked in a counter-clockwise direction (Figure 3) by a tension spring 85. Pivotally arranged on a shaft 87 at the other end of the valve block 73 is a lever 86 and a tension spring 88 rocks the said lever 86 in a clockwise direction (Figure 3). The lever 80 is pivotally connected to the slide valve 75 and the elbow lever 79 to the slide valve 74. The lever 86 can also act on a collar 89 of the slide valve 75 and on the end faces of the slide valve 74 and of the piston 76. The lever 83 can bear on the end of the slide valve 74 on a collar 205 of the slide valve 75 and on the end of the piston 77. Connected to the valve block 73 are the pipe lines 51, 52, 90, 91, 92, 63, 93, 94, 95. The control elements V and VI serve for controlling the feeding movements of the carriage 7, which may be effected either by manual actuation by means of the feed-setting lever 78 and the levers 79 and 80, or may be controlled by the cams 47, 47a.

*Control element VII.*—Arranged for longitudinal displacement in a housing 96 is a further hydraulic means or a slide valve 97, which is held in the position shown in Figure 3 by means of a compression spring 98. The lever 99 is adapted to be rocked about a shaft 100, one of the ends of the lever 99 engaging in the fork 151 of the lever 34, as previously described, while the other end of the lever 99 engages a fork 204 of the slide valve 97. The lever 99 may be rocked about its shaft 100 by applying pressure to pipe line 102 of the control element VII. In doing so, by means of the fork 151, the lever 34 and the driver member 36, the valve slide 31 (normally held in the topmost position shown in Fig. 3) by means of the spring 32 is moved to its lowered position shown in broken lines in Figure 3. Connected to the housing 96 are the pipe lines 102, 103. The control element VII mechanically controls the movements of the valve slide 31 and hydraulically controls, through the control elements VIII and XI, the axial displacement of the control drum 50, as set forth hereinafter.

*Control element VIII.*—In a slide valve housing 104, a longitudinally displaceable valve 105 is held by a compression spring 106 in the position shown in Figure 3. Arranged on the housing 104 are the pipe lines 102, 103, 107, 108, 109, 110. The control element VIII serves to initiate the first of the automatically repeating operations in a multiple-cut copying process.

By manually pushing in the valve 105, the valve slide 31 is lowered as described above, and the control drum 50, by means of control element X, is brought back into its initial position.

*Control element IX.*—Arranged in a housing 125 in the main carriage 7 is a rotary slide valve 111, (Figs. 3 and 6) with a lever 113a. A switch rod 113, carrying two switch arms 112 and 114 (Fig. 6) and two collars 112a and 114a is guided in the housing of the main carriage 7. In its two end positions the switch rod is axially displaced by a shift disc 171 fixed to a toothed pinion 127, as will be later described. The lever 113a is arranged between the two collars 112a and 114a. Connected to the housing 125 are the pipe lines 71, 93, 126, the latter being connected to the sump. By means of the control element IX, a further control operation is rendered impossible after completion of the last cut of a multi-cut copying process.

Figure 11:
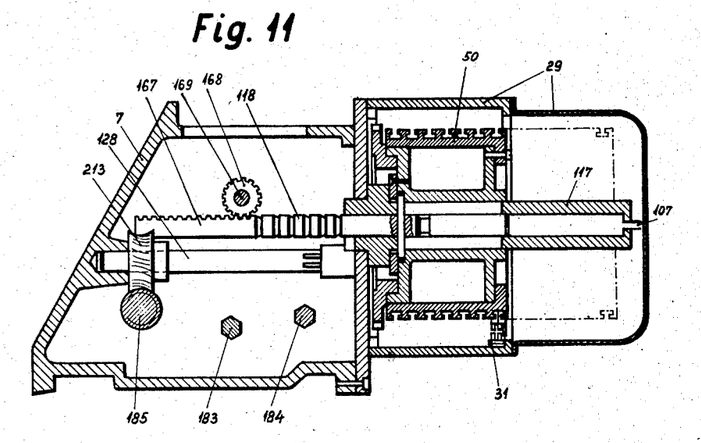
Fig. 11 is a section along the line 11—11 of Figure 1.

*Control elements X and XI.*—Arranged in the carriage 7 is the control drum 50 shown in Figures 6 and 11, and also the associated shift members arranged on the periphery of the drum 50 in the present constructional example there are seven T-grooves 132 which, after fitting suitable cams, permit six directly succeeding rotational cycles on the machine to be automatically controlled. The number of T-grooves may be larger or smaller. A guide sleeve 116 with the attached cylinder 117 are fixedly mounted in the carriage 7. Arranged on an axially movable control shaft 118 is a drum hub 123 which is secured against turning and axial displacement by means of a pin 119. Arranged in the shaft 118 are seven notches 120 with the same spacing as that of the T-grooves 132 from one another.

In order to lock the actual axial position of the control shaft 118 with respect to the carriage 7, there is provided a ball 122 which is urged by a spring 121 into one of the notches 120. Fixed to the drum hub 123 it a toothed rim 124, the teeth of which mesh in a pinion 127, which is displaceable longitudinally on a key shaft 128 mounted in the carriage 7, the pinion 127 being forced by a switch disc 171, which is rigidly connected thereto and which enters a groove 172 between the control drum 50 and the pinion 124, to remain constantly in engagement with the toothed wheel 124 even when the control drum 50 is moved axially. The control drum 50 with the cams is interchangeable and it can be pushed on to the drum hub 123 and be fixed thereon by screws 129, slots 130 in the control drum 50 permitting limited relative turning movements. This possibility of replacement permits the entire control drum 50 together with all cams which are necessary for machining a certain workpiece to be stored until it is to be used again. A graduation 131 (Figure 8) on the control drum 50 permits the accurate adjustment of the cams 47, 47a, 60, 60a, 101 (Figure 7) with relation to their position on the lathe bed 3. The rotational motion of the control drum 50 corresponds to the longitudinal displacement of the main carriage 7 on the track 6 of the copying lathe. The graduation 131 (0:700) corresponds to the turning length of the lathe which length is, in the example illustrated, 700 mm. Thus, by way of example, if one of the cams is set at 350 on the graduation 131, the operation which this particular cam controls, will occur at a distance of 350 mm. from the end of the workpiece. The longitudinal movements of the carriage 7 on the lathe bed 3 are converted into corresponding rotational movements of the control drum 50 by means shown in Figures 6 and 11. As already described, the feed spindle is held axially and secured against turning in the stands 1 and 5 and a toothed wheel 213 keyed to the key shaft 128 meshes with the feed spindle 185 and thus transmits the above-mentioned movements.

The arrows F and R on the drum 50 (Fig. 8) refer to the directions of movement of the carriage 7, namely, forward and return.

Figures 7, 8:
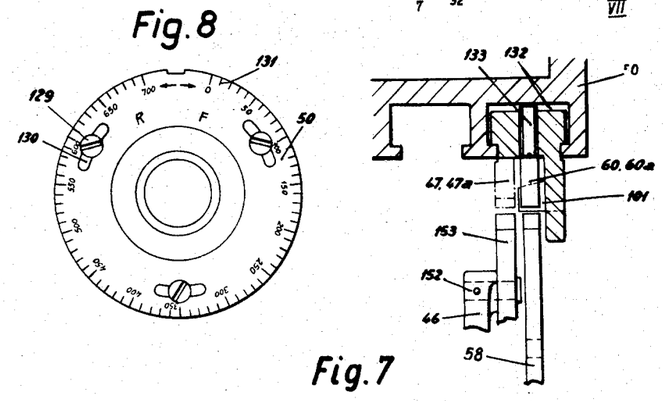
Fig. 7 shows details of the cams on the drum and the associated latch lever.
Fig. 8 is a fragmentary view of the control drum, seen in the direction of the arrow in Figure 6.

Figure 7 shows the arrangement and method of fixing the cams 47, 47a, 60, 60a, 101 by screws 133 in one of the T-grooves 132 of the axially displaceable control drum 50 in the lowered position of the valve slide 31 with the fixidly arranged control valves. It will be seen from Figure 7 that the cams 47, 47a, 60, 60a and 101 shown diagrammatically in Figure 3 on the control drum 50 must always be positioned in each of the T-grooves if the operations controlled thereby are to be carried out. A starting cam 101 is fitted into the first T-groove 132 preferably at the point 0 of the control drum 50 as seen in Figure 8. By this cam 101 a complete control cycle is initiated, and the cams 60a which interrupt the high speed return movement of the main carriage 7 after each cut, are fitted into the following T-groove 132, as hereinafter described. The control drum 50 is formed with seven T-grooves in equal distances from each other and the various cams have the following functions: Cam 101, fitted only in groove 1, serves for initiating a complete cycle, cams 60 interrupt the feed motions of main carriage 7; cams 60a interrupt the high speed return movement of the main carriage 7, cams 47 serve for reducing a normal feed movement to a half speed feed movement of the main carriage 7 only as long as they are influencing the control element I; cams 47a serve for moving the main carriage 7 at a high forward speed as long as they influence the control element I, and cams 47 and 47a may be utilized in any one, or all of the T-grooves 132 as the operation demands.

In a complete cycle with six consecutive cuts or turning operation the following cams have to be fitted:

1st groove; cam 101 (and cams 47 and 47a, if needed), and cam 60;

2nd to 6th groove: cam 60a (and cams 47 and 47a if needed), and cam 60;

7th groove: cam 60a;

(The cams 47 and 47a are not needed if there are no half speed feed movements or high forward speed movements of the main carriage in one of the passes of the tool.)

A latch lever 135 is rockable about a shaft 136 on a bracket 134 on the carriage 7 (Figure 6), a tension spring 137 turning the latch lever 135 in a counter-clockwise direction (Figure 6). One end of the latch lever 135 rests on one of the ends of a piston 139 which is displaceable longitudinally in the housing 138 and which constitutes together with the latter the third hydraulic means. Arranged at the other end of the latch lever 135 is a latch or pawl 174 which is rockable about a pin 173 and which can engage in the notches 120 of the control shaft 118, a leaf spring 175 urging the pawl 174 towards the control shaft 118. The tilting movement of the pawl 174 about the pivot 173 is limited by a stop 203 which is arranged on the bracket 134 and which retains the pawl 174 in the position shown in Figure 6, only permitting a tilting movement when the piston 139 is moved towards the left. Connected to the housing 138 are the pipe lines 108, 140. The control element X serves to shift the control drum 50 into its starting position at the commencement of a cycle of cutting operations. By means of the control element XI, the control drum 50 is always advanced axially by the graduation of one of the T-grooves after completing one cutting operation.

*Control element XII.*—Arranged for longitudinal displacement in a housing 160 is a slide valve 161 and the pipe lines 92, 95, 110, 140, 148, 149, 163, 164 are connected to the said housing. The control element XII serves to shift the hydraulic control system from the operating method "single cut" to "multiple cut" and vice versa: in the position of the slide valve 161 as shown in Figure 3, the control system is set for "multiple cut".

*Control element XIII.*—Arranged for longitudinal displacement in a housing 162 is a slide valve 165 with a bore 166. Connected to the housing 162 are the pipe lines 61, 62, 68, 164. By means of the control element XIII, it is possible during a sequence of multiple cutting operations instantaneously to remove the cutting tool out of engagement with the workpiece 35 and at the same time there is carried out a change-over of the control element XII automatically to "single cut."

In the case of breakage of the copying tool it is desirable, or even necessary to withdraw the latter as quickly as possible from the workpiece to prevent further damage to the workpiece 35 and to the tool 11. Pressure medium from the pipe line 62 enters the pipe line 164 and pushes the valve 161 of the control element XII downwards, whereby this element is set for hand control or single cut.

Figures 12, 13:
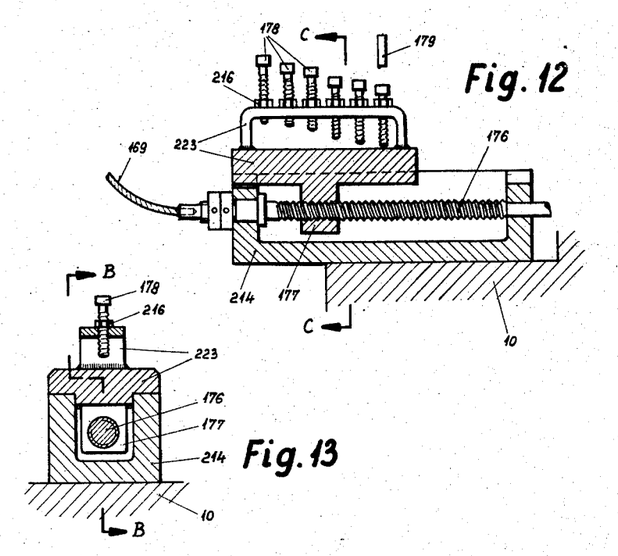
Fig. 12 illustrates details of the depth stop and is a longitudinal section along the line 12—12 of Figure 13.
Fig. 13 is a transverse section along the line 13—13 of Figure 12.

Arranged on the longitudinally displaceable control shaft 118 is a rack 167 which is shown diagrammatically in Figure 3 and which is engaged by a toothed pinion 168 mounted in the carriage 7; a flexible shaft 169 leads from the pinion 168 to a threaded spindle 176 which is held axially in a bracket 214 fixed to the copying slide 10, said spindle being shown in detail in Figures 12 and 13. Mounted on the spindle 176 is a nut 177 on which is arranged a slide 223 with six depth stop screws 178. The transmission between these elements (i.e. the rack 167 and threaded spindle 176) is such that an axial displacement of the control shaft 118 by the separation of one of the notches 120 corresponds to a longitudinal displacement by one step on the slide 223 with the depth stop screws 178 with respect to the rod 179 of the control valve 24 (Figure 9). By setting each of the depth stop screws 178 to the desired height and locking them by means of the corresponding nuts 216, it is thus possible to determine in advance the maximum feeding depth of the cutting tool 11 with respect to the axis of rotation for each of the six cutting operations.

As shown in Figure 10, the gearing shafts 181, 182 are mounted so as to be rotatable but not moveable axially in a feeding gear box 8 in the carriage 7. Held axially in the machine stands 1 and 5 are a feed shaft 183 and a high-speed shaft 184. The drive for the two shafts 183 and 184 is effected from the head stock 2 by means which are not shown. A feed spindle 185 is also held axially and secured against turning in the stands 1 and 5.

Mounted on the feed spindle 185 is a nut 186 with a toothed rim 187, which is constantly in mesh with a toothed wheel 188 keyed to the gear shaft 182. Displaceable axially on the gear shaft 182 are two ratchet wheels 189, 190 with coupling teeth. Mounted on the gearing shaft 181 by means of a collar 191 are two plate couplings 192, 193 and also the wheels 194, 195. The pipe lines 53, 54 open into the gearing shaft 181 and the pipe lines 91, 94 into the gearing shaft 182.

With the supply of medium under pressure through the pipe lines 53 or 54 and 91 or 92 the different advance and return speeds of the carriage 7 on the lathe bed 3 which are required are obtained through the plate couplings teeth in known manner.

Arranged in the carriage 7 is a pump 196 with a pressure conduit 197, which leads to a distributor 198, and also an overflow valve 199, which is adjusted to a predetermined working pressure.

The hydraulic copying assembly which is of known construction and which is not described in greater detail here, is provided as indicated in Figure 9 by a separate pump (not shown) with pressure medium which is fed by way of the conduit 200 and is discharged by way of the conduit 201.

In the example illustrated, the workpiece is held between a chuck 202 and the tail stock 4 and is set in rotation by the head stock gearing.

The operation of the control arrangement shown in Figures 1 to 14 is as follows:

With non-automatic working, the slide valve 161 in the control element XII is drawn downwardly (Figure 3) and then first of all the workpiece 35 is clamped by hand. The longitudinal feed and the hydraulic copying attachment are likewise switched on by hand, by means of the lever 78. By moving the latter into any one of six possible positions (Fig. 3), the various displacing speeds of the main carriage 7 in any one of the two directions are obtainable. By moving the lever 78 to a feed forward position, the control elements V, VI and III are brought into such a position that the copying slide 10 is moved from its stand-by position (top-right) in the direction of the workpiece 35. By pushing the slide valve 75 to the left, the valve 66 is also moved to the left and pressure medium from the pipe line 69 escapes through the pipe line 72 to the sump. As the main carriage 7 moves from right to left (Figure 1) the feeler member 22 is guided along the copying template 26 and the tool 11 machines the workpiece. This operation can be followed in Figures 3, 9 and 10; it is to be noted that the control element III can be shifted by the adjusting lever 67 into its end position at the left (not shown in Figure 3), so that medium under pressure from the pump 196 can pass by way of the pipe line 70 into the discharge 72. The pipe line 69 is without pressure and the copying control slide valve 24 commences to operate. By means of the lever 78, the control elements V and VI are set for forward feed. Pressure medium can thereby pass from the pump 196 by way of the pipe line 90 into the pipe line 51 to the control element I and from the latter, by way of the pipe line 53, can switch on the normal feed in the feeding gear box 8, where the wheel 194, being in mesh with the wheel 194b on the feed shaft 183 by means of the clutch 192 and the collar 191, is coupled to the gearing shaft 181 and through the wheel 194a to the wheel 189. Simultaneously, pressure medium passes through the pipe lines 90 and 91 to the slide wheel 189 which is shifted to the right and engages with the toothed wheel 188, being in mesh with the toothed rim 187 of nut 186. By rotating nut 186, the gear box 8 and with the latter the carriage 7 is displaced at the desired speed and in the desired direction. From the normal speed, the change to half feeding speed or high-speed forwardly can be selectively adjusted by hand by setting the lever 78 into the desired position. In so doing the control elements V and VI are moving into such position that the pipe lines 53, 54, 91 and 94 are supplied or not supplied with pressure medium, as the case may be. Half feeding speed of main carriage 7 is obtained when the slide valve 74 is pushed to the left by means of lever 78, the pipe lines 53 and 54 being connected with the sump by the pipe lines 51 and 52. Rotational motion from the clutch 193 by means of the wheels 183a and 181b, the now working overdrive clutch 181a and the members 181, 194a, 189, 188, 187, 186 is transmitted to the main carriage 7. If the copying slide 10 has reached the end of the workpiece 35, there is effected by the cam 60 an actuation of the control element II towards the left, whereby first of all the feed is switched off. Pressure medium can now pass by way of the pipe lines 62 and 61 into the pipe line 68 and force the control element III toward the right. By this movement the slide valve 75 of the control element VI is also forced to the right into its middle position shown in Figure 3, in which the feed motion in the gear box 8 is interrupted. Pressure medium enters now from the pipe line 70 into 69 and forces the control slide valve 24 upwards against the force of spring 30. The copying slide 10 is lifted off the workpiece 35 and returns to the upper end position. The control element VI is displaced towards the right to the stop position and thereby the feed is interrupted. The copying slide 10 returning to the upper initial position actuates the control element IV through the adjusting shaft 17, whereby the rearward high-speed movement is adjusted through the control elements V and VI. The control valve 75 is pushed to the right so that pressure medium from pipe 90 can pass to pipe 94. At the same time the cam 47*a* set at the proper position on the drum 50 has been pushing the slide valve 42 fully to the left so that pressure medium from pipe 90 can pass to pipe 54 through the pipe 51. As described above, high speed rearward movement of the main carriage 7 is then on. At the end of the return travel at high speed, the control element II is again displaced towards the right by means of the cam 60*a* and thereby the rearward high-speed movement is switched off. Pressure medium from members 197 and 62 passes to control element II and to pipe 63, and pushes control slide valve 76 in control element VI to the right. Control valves 74 and 75 are thus pushed into the positions shown in Figure 3.

The control arrangement can also be used with semi-automatic working, in order to carry out a number of cuts one after the other and to effect all feeding and adjusting movements at the copying lathe. The change-over from the above described single-cut copying process to multiple-cut copying is effected at the control element XII by pushing the latter into its upper position shown in Figure 3. In this position the slide valve 161 allows the pressure medium to control the various control elements for obtaining a multiple cut cycle as follows:

(*a*) The valve 105 of the control element VIII is urged towards the spring 106 by hand. Pressure medium from the pipe line 109 enters the pipe line 102 in control element VII and forces the piston 97 downwards. By means of the levers 99 and 34, the valve slide 31 with the control elements I and II, is lowered so as to position the levers 58 and 153 out of reach of the cams 47, 47*a*, 60, 60*a* and 101, when the control drum 50 is subsequently shifted axially. The lever 58 of the control element II is now free, and the valve 49 returns to its neutral position shown in Figure 3. The pipe line 63 is pressureless and the spring 88 brings the piston 76 into the position shown, where the pipe line 93 is closed. Pressure medium from the line 102 enters the lines 103 and 107 (as the control element VIII is still in the pushed-in position) and reaches the cylinder 117. The control drum 50 is now shifted to the left (Fig. 6) and the switch rod 113 is pushed to the left into the position shown in Fig. 6, where the lever 113*a* connected to the rotary slide valve 111, revolves the latter so that the pressure medium can flow from the pipe line 93 to the pipe line 71.

At this moment the control element VIII can be released and the spring 106 forces the piston 105 back into the position shown. For each cutting operation each groove 132 in the control drum 50 must be fitted with suitable cams 47, 47*a*, 60, 60*a* and 101. After releasing the control element VIII, the pipe line 102 of the control element VII is connected to exhaust 147 through the lines 110, 148 and the spring 98 again forces the piston 97 of the control element II into its initial position and thereby brings the two control elements I and II into the range of the cams 47, 47*a*, 60, 60*a*, 101, in which the valve slide 31 is urged by the spring 32 against the stop 158. The valve slide 31 is now lifted into the position shown in Figure 3 by the spring 32, and the cam 101 which is illustrated in Fig. 7 and which is fitted in the first T-groove 132, forces the valve 49 of the control element II to the right. Pressure medium from the pipe line 62 enters the pipe line 63 and forces the piston 76 to the right and rocks the lever 86 in a counter-clockwise direction.

Pressure medium from the line 90 flows through the control elements V and VI to the lines 93 and 71. The slide valve 66 of the control element III is shifted to the left and the line 69 is connected with exhaust 72. As can be seen from Figure 9, the copying attachment is now free to operate. The tool slide 10 with its tool 11 begins to move in the direction of workpiece 35. The path of displacement is limited either by the contact of the feeler 22 with the template 26 or by the contact of the rod 179 with one of the depth stop screws 178.

By the displacement of tool slide 10, the adjusting shaft 17 is revolved and the piston 143 of the control element XIV is pressed downwards. Now pressure medium from the line 150 enters the lines 149 and 95 where the piston 75 is moved to the left. Pressure medium from the line 90 enters the line 51 and flows through the control element I and the pipe line 53 to the main carriage 7. As the valve 75 has been pushed to the left, pressure medium from the line 90 also enters the line 91, leading to gear box 8. By applying pressure to the lines 53 and 91 forward feed motion is obtained in the gear box 8, as previously described.

(*b*) At the end of the first feeding movement, the control element II is shifted towards the left by the end cam 60*a*. In succession, there now takes place by means of the control element III which is shifted towards the right, the return motion of the copying slide away from the workpiece 35 and the interrupting of the feeding motion of the carriage 7 by means of the control elements V and VI. During the return, the copying slide 10 turns the adjusting shaft 17 and for a certain period of time holds the control element IV in its bottom position. The pressure medium now from the line 150 flows through the lines 148, 110 and 102 into the control element VII, in which the piston 97 is forced downwards and thus lowers the valve slide 31 into its lower position. Pressure medium from the line 102 enters the line 103 and flows through the control element VIII into the line 108 to force the piston 139 in the control element XI to the right in the embodiment shown in Fig. 3, and to the left in the embodiment shown in Fig. 6. Due to this movement, the latch lever 135 is rocked about its shaft 136 and, as already described, displaces the control drum 50 for the distance between two of the notches 120 to the left (Fig. 3). Pressure medium from the line 108 enters the lines 140 and 92 and pushes the piston 77 to the left. The lever 83 is rocked in a clockwise direction and first of all interrupts the feed movement of the main carriage 7 as the pipe line 91 is connected to the sump. Then the slide valves 75 and 74 are fully pushed to the right and pressure medium from pipe 90 passes to 52 and 54 and at the same time from pipe 90 to pipe 94 and thus switches on the high speed return movement of the main carriage 7, as described above. This latter movement persists until the cam 60*a* in the second T-groove 132 of the control drum 50 touches the lever 58 and thus stops the high speed return movement, as already described. During this part of the cycle the tool slide 10 has risen to its upper position due to the movements of the valve 66 of the control element III. Pressure medium from the line 62 enters the line 63 in the control element II and pushes the valve 76 to the right. Now pressure medium flows from the line 90 into the lines 93 and 71, and pushes the valve 66 to the left to allow the copying attachment to operate. At the same time the control elements V and VI are displaced and again control the forward feed motion of main carriage 7 as described.

(*c*) The next cutting operation is initiated by the feeding movement of the copying slide 10. In this case, care must be taken that by the previous displacement of the control drum 50 by one line, the depth stop 178 is also advanced by one unit. Figure 9 shows the depth stop 178 in the position of the fourth cutting operation. As soon as the feeding movement of the copying slide 10 for the second cutting operation is completed and the feeler member 22 has contacted the template 26, the longitudinal feed is also switched on again. The second cutting operation is now carried out in the same manner as the first as far as the end of the template. An end cam on the second line of the control drum 50 switches off the longitudinal feed. In successive phases, the copying slide 10 is withdrawn, the control drum 50 is shifted forward to the third line and the high-speed travel for the longitudinal feed is switched off.

(d) Corresponding to the number of lines of the control drum 50, the succeeding cutting operations now follow automatically as above described. In the example illustrated, it is possible to carry out six cutting operations automatically one after the other. The control drum 50 comprises a seventh so-called finishing line in which only one cam 60a is fitted. During the high speed return movement of the main carriage 7 the control drum 50 has been axially displaced into its end position (right hand side). By this movement the control element IX has been actuated, for example, the rod 113 has been axially displaced by the shift disc 171 pushing the lever 114 together with the rod 113 to the right. The collar 114a moves the lever 113a to the right and the rotary slide valve 111 is revolved to close the inlet pipe line 93 and connect the pipe line 71 with the sump line 126. The high speed return motion of the main carriage 7 comes to an end when the lever 156 and the valve 49 are actuated by the last cam 60a. Pressure medium from the line 62 enters the line 63, pushes the valve 76 to the right and interrupts the high speed return movement of main carriage 7. Due to the fact that by means of the control element IX, the flow from the line 93 to the line 71 is interrupted, the whole cycle is stopped. The tool slide 10 remains in its upper position and no further feed or high speed motion of the main carriage 7 can take place.

(e) The finally turned workpiece 35 is now released. If another workpiece is to be machined according to the same template and with the same cutting operations, it is sufficient if a fresh unmachined workpiece is clamped and the control element VIII is briefly pushed in for initiating the repeated operations.

In exceptional cases, for example in the event of breakage of the tool or workpiece, it may be necessary to take the tool 11 from the cutting position during a cutting operation. This may be effected by pressing in the control element VIII for a short while. Pressure medium from the line 62 enters the line 164 and pushes the valve 161 in the control element XII in a position (not shown) which serves for operating the machine with "single cut." Pressure medium from the line 62 also enters the line 68 which has so far been connected to the exhaust through the line 61. Pressure medium flowing through the line 68 into the control element III, pushes the valve 66 to the right and pressure medium from the line 70 passes to the line 96 and lifts tool slide 10 from the workpiece 35. All further operations on the lathe can be manually controlled separately and independently of one another as previously described. If automatic recycling is desired the control element XII has to be pushed in again as mentioned above.

Instead of the arrangement chosen in Figures 1 to 6 for the displacement of the control drum 50, the construction according to the invention may also be such that the control drum 50 remains fixed axially and the control elements I, II, VII and IX are arranged to be displaceable axially. In this case, the transmission means for the setting of the depth stop must be actuated by a slide supporting the axially displaceable control elements.

What I claim is:

1. In a lathe copying the outline of a template or pattern upon a work piece and having a lathe bed, a carriage movable longitudinally upon said lathe bed, a tool-carrying copying slide slidably mounted in said carriage, a template-engaging feeler mounted on said slide; a control mechanism comprising a cylindrical control drum mounted on said carriage, means driving said drum in accordance with the movement of said carriage, a plurality of cams mounted upon said drum in radial planes, a plurality of control valves carried by said carriage mounted in line with the cams of a radial plane of said drum and adapted to be selectively engaged and actuated by said cams of the control drum, a feed gear box carried by said carriage; means operatively connecting said feed gear box with said carriage for actuating said carriage and including first hydraulic means connecting certain of said control valves with said feed gear box for starting and stopping the actuation of said carriage by said feed gear box, second hydraulic means controlled by certain of said control valves for moving said copying slide, and third hydraulic means controlled by certain of said control valves for providing a relative shifting movement between the control valves and the control drum axially of the latter for presenting the cams of another radial plane to said valves.

2. In a lathe copying the outline of a template or pattern upon a work piece and having a lathe bed, a carriage movable longitudinally upon said lathe bed, a tool-carrying copying slide slidably mounted in said carriage, a template-engaging feeler mounted on said slide; a control mechanism comprising a cylindrical control drum mounted on said carriage and having a plurality of equal peripheral grooves formed therein, each of said grooves being situated in a radial plane of said drum, means driving said drum in accordance with the movement of said carriage, a plurality of cams adjustably mounted in said grooves of said drum, a plurality of control valves carried by said carriage mounted in line with the cams of one groove and adapted to be selectively engaged and actuated by said cams of the control drum, a feed gear box carried by said carriage; means operatively connecting said feed gear box with said carriage for actuating said carriage and including first hydraulic means connecting certain of said control valves with said feed gear box for starting and stopping the actuation of said carriage by said feed gear box, second hydraulic means controlled by certain of said control valves for moving said copying slide, and third hydraulic means controlled by certain of said control valves for providing a relative shifting movement between the control valves and the control drum axially of the latter for presenting the cams of another groove to said valves.

3. A control mechanism in accordance with claim 2, wherein groups of cams are arranged in said grooves to control a plurality of cutting operations, the cams of one group being arranged in one of said grooves and controlling one of said cutting operations.

4. In a lathe copying the outline of a template or pattern upon a work piece and having a lathe bed, a carriage movable longitudinally upon said lathe bed, a tool-carrying copying slide slidably mounted in said carriage, a template-engaging feeler mounted on said slide, a control mechanism comprising a cylindrical control drum mounted on said carriage, means driving said drum in accordance with the movement of said carriage, a plurality of cams mounted upon said drum in radial planes for initiating a sequence of cutting operations, the cams of each plane initiating one cutting operation, a plurality of control valves carried by said carriage and mounted in line with the cams of a predetermined one of said radial planes of said drum in a starting position thereof, said control valves being adapted to be selectively engaged and actuated by said cams of the control drum, a feed gear box carried by said carriage, means operatively connecting said feed gear box with said carriage for actuating said carriage and including first hydraulic means connecting certain of said control valves with said feed gear box for starting and stopping the actuation of said carriage by said feed gear box, second hydraulic means controlled by certain of said control valves for moving said copying slide, third hydraulic means controlled by certain of said control valves for shifting said control drum axially of said control valves for presenting the cams of another of said radial planes to said valves at the end of each cutting operation of said sequence, and further hydraulic means controlled by certain of said control valves for returning said control drum to said starting position at the end of said sequence to thereby automatically prepare said control mechanism for a further sequence of cutting operations.

5. In a lathe copying the outline of a template or pattern upon a work piece and having a lathe bed, a carriage movable longitudinally upon said lathe bed, a tool-carrying copying slide slidably mounted in said carriage, a template-engaging feeler mounted on said slide, stop engaging means movably mounted on said slide and stationary with respect to said carriage, a control mechanism comprising a cylindrical control drum mounted on said carriage, means driving said drum in accordance with the movement of said carriage, a plurality of cams mounted upon said drum in radial planes, a plurality of control valves carried by said carriage mounted in line with the cams of a radial plane of said drum and adapted to be selectively engaged and actuated by said cams of the control drum, a template depth stop carried by said slide for movement therewith and adjustable with respect thereto and adapted for cooperation with said stop engaging means, a feed gear box carried by said carriage, means operatively connecting said feed gear box with said carriage for actuating said carriage and including first hydraulic means connecting certain of said control valves with said feed gear box for starting and stopping the actuation of said carriage by said feed gear box, second hydraulic means controlled by certain of said control valves for moving said copying slide, said stop engaging means cooperating with said second hydraulic means and adapted to limit the movement of said copying slide, and third hydraulic means controlled by certain of said control valves for providing a relative shifting movement between the control valves and the control drum axially of the latter for presenting the cams of another radial plane to said valves; and transmission means connecting said control drum with said depth stop for adjusting the latter in proportion to said relative shifting movement of said control drum to thereby limit the feed movement of said copying slide according to said adjustment of the depth stop.

6. In a lathe copying the outline of a template or pattern upon a work piece and having a lathe bed, a carriage movable longitudinally upon said lathe bed, a tool-carrying copying slide slidably mounted in said carriage, a template-engaging feeler mounted on said slide, a control mechanism comprising a cylindrical control drum mounted on said carriage, means driving said drum in accordance with the movement of said carriage, a plurality of cams mounted upon said drum in radial planes, a plurality of control valves carried by said carriage mounted in line with the cams of a radial plane of said drum and adapted to be selectively engaged and actuated by said cams of the control drum, a feed gear box carried by said carriage, means operatively connecting said feed gear box with said carriage for actuating said carriage and including hydraulic means connecting certain of said control valves with said feed gear box for starting and stopping the actuation of said carriage by said feed gear box, and hydraulic means controlled by certain of said control valves for moving said copying slide.

References Cited in the file of this patent

UNITED STATES PATENTS

| | | |
|---|---|---|
| 1,691,595 | Van Hamersveld | Nov. 13, 1928 |
| 2,540,323 | Cross | Feb. 6, 1951 |
| 2,586,183 | Stewart | Feb. 19, 1952 |
| 2,594,782 | Makant | Apr. 29, 1952 |
| 2,634,644 | Johnson | Apr. 14, 1953 |